INVENTORS
PAUL SEIFERT
LUNG PAO CHEN 3,475,132
FLUIDIZED BED FOR THE GRANULATION
OF FERTILIZERS
Paul Seifert and Lung Pao Chen, Domat, Ems, Switzerland, assignors to Inventa A.G. fur Forschung und Patentverwertung, Zurich, Switzerland
Filed Dec. 23, 1964, Ser. No. 420,630
Claims priority, application Switzerland, Jan. 7, 1964, 59/64
Int. Cl. B01t 2/04, 2/02
U.S. Cl. 23—259.1                2 Claims

ABSTRACT OF THE DISCLOSURE

A fluidized bed in which the material to be granulated is sprayed directly into the swirling bed is disclosed.

---

Figure 1:
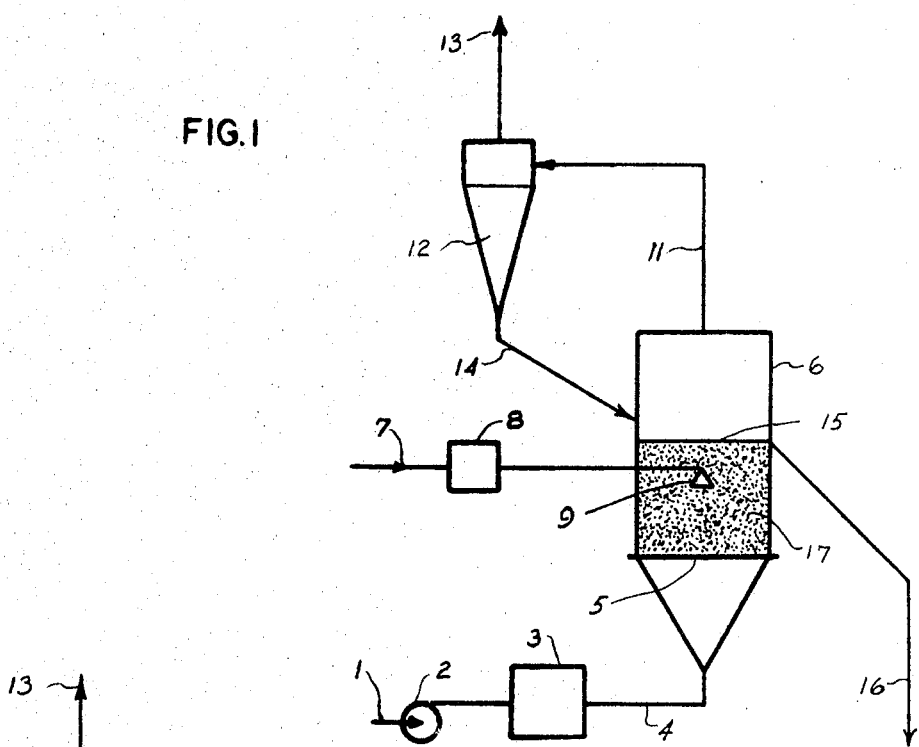

The invention relates to a process and a device for the continuous granulation of materials, particularly for the granulation of nitrogeneous fertilizers, such as urea, ammoniaum nitrate, ammonium sulfate, and similar substances.

Nitrogenous fertilizers, such as the ones named above, preferably are employed by their users in the form of free-flowing pourable small beads, i.e., granulated or prilled.

A number of processes are known for shaping fertilizers accordingly. The best known and most widely practiced method is carried out by dividing a highly concentrated, practically waterfree melt into small drops at the upper end of a tower either mechanically or by spraying. These drops then fall down within the tower while countercurrently meeting cooling gases, thereby solidifying.

Aside from the fact that this process requires voluminous equipment since spraying towers may reach a height up to 30 meters, it also is not truly continuous since the process must be periodically interrupted for the purpose of cleaning the inner walls of the tower from adhering material.

A similar manner of prilling is taught in German published application 1,044,120. According to this method, the drops do not fall down vertically, but ars sprayed in an arc into a chamber having a certain angular structure, wherein the cooling air, introduced countercurrently, effects solidification. This process also requires extensive and costly equipment. In the methods named above and in all hitherto known procsses for prilling and granulation it is a stringent requirement that the materials to be treated are practically free of water. A urea, melt, for instance, is used having a moisture content of approximately 5 percent. Drying of urea, however, is especially critical because overly strong heating leads to an increase in the biuret content which is highly undesirable.

It therefore is the object of the instant invention to point a way for a process for the granulation of materials which avoids the above-named drawbacks; i.e., the expenditure of large and ungainly equipment and a drying of the materials to a pracitically waterfree state are not required.

By the process according to the invention, materials such as nitrogenous fertilizers, and especially urea, ammonium nitrate and ammonium sulfate are granulated in the following manner:

Heated aqueous solutions containing 50–95 percent by weight of the fertilizers are sprayed into a column through which heated air flows from the bottom upwards. The temperature and the velocity of the air flow is regulated in such a manner that water is removed from the drops sprayed into the column and that the fertilizer beads thus formed are held in suspension in a swirling bed. Solidified beads continuously are drawn off from the column through an opening in the swirling bed; the air together with entrained fertilizer particles in dust form is conducted through a cyclone disposed at the upper end of the column and therein is freed from those particles which are recycled into the column where they again participate in the granulated formation in the swirling bed.

The great advantages of the process according to the invention reside in the fact that the device used therefor is simple and small and has no moving parts; that drying and granulation can be carried out in a single process step; and that the heat of crystallization liberated in the fabrication of the fertilizer is utilized completely and without especial provisions for evaporation and/or concentration. The granulation in the whirling layer bed is based on the following phenomena occurring partly simultaneously and partly in succession:

A drop of the hot fertilizer solution, sprayed into the column, immediately can be dehydrated by the hot air, and the solid bead thus formed can immediately be removed through the outlet. When this bead is permitted to remain in the bed, it can serve as a nucleus for a larger-size particleus by agglomeration with a newly sprayed-in drop of the solution. Furthermore, the feasibility is given to combine two or more already present smaller particles by a newly sprayed-in droplet which acts as an adhesive.

Figure 2:
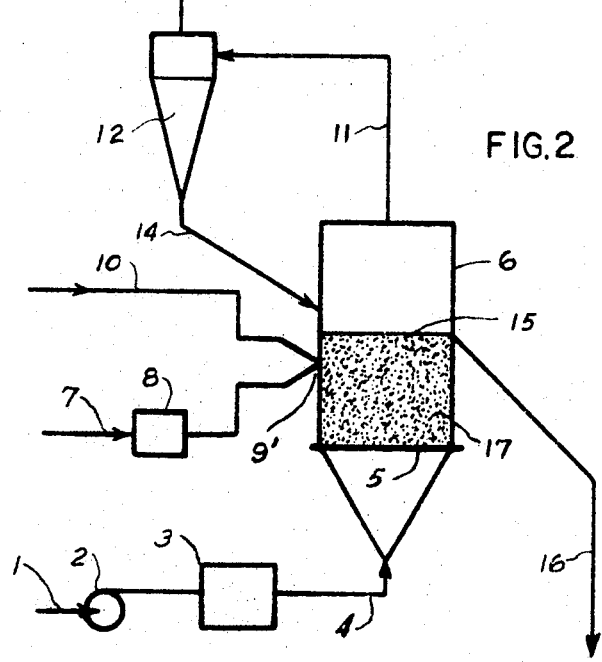

The accompanying drawings are flowsheets of two embodiments of the invention. FIGS. 1 and 2 are substantially alike. The sole difference is found in the nozzles 9 and 9', respectively. In FIG. 1, 9 represents a conventional nozzle through which the fertilizer solution is sprayed into column 6, whereas, in FIG. 2, an atomizing jet 9' is used. The latter is of advantage when comparatively concentrated and viscous solutions are employed.

The process now will be further explained with reference to the drawings, and later on, by an example. However, it should be understood that these are given by way of illustration, and not of limitation, and that numerous changes may be made in the details without departing from the spirit and the scope of the invention as hereinafter claimed.

Referring now to the drawings, an aqueous 50–95 weight percent fertilizer solution is introduced by way of line 7 into the continuous heater 8 and therein is heated to substantially 120–145° C. The heated solution then is sprayed directly into the swirling bed 17 in column 6 by way of either nozzle 9 or atomizing jet 9'. The choice of the nozzle depends upon the concentration and, thus, viscosity of the solution. For a less concentrated solution a simple nozzle 9 suffices, while a highly concentrated solution is handled more advantageously by an atomizing jet 9'. In the case of 9', compressed air is introduced therein from line 10 to supply additional pressure. The ordinary pressure means for the introduction of the solution into column 6 are not shown in the drawing.

Simultaneously with the spraying of the solution, hot air is blown into the column by way of line 1, blower 2, continuous heater 3 and entrance pipe 4. The air attains a temperature of substantially 60–125° C. in the heater and is distributed in the column 6 by a perforated plate or a sieve 5 disposed near the bottom of the column. This flowing hot air serves as a drying medium for the solution and for the maintenance of a swirling bed 17 formed of dried and shaped fertilizer particles (beads). The droplets of the solution sprayed through 9 or 9', respectively, are dehydrated by the hot air stream. The solid particles thus forming either are removed directly through an opening 15, an overflow at the swirling bed level, or they remain in the swirling bed 17, where they form bead-like solid granules together with newly introduced droplets or with other solid particles, e.g., those returning from the cyclone (see below). The granulate continuously is withdrawn through overflow 15 and conducted to a collector (not shown) by way of line 16. If it is desired that the granulate be used as fertilizer of a given size range, outsized and undersized particles can be removed in the customary manner, e.g., by sifting. The undersized granules can be recycled directly into the bed 17 by way of a feed pipe (not shown) or can be used for a number of purposes, e.g., as animal feed additive. Oversized particles must be comminuted prior to re-use in the same manner as just described. The waste gas consists of air with entrained steam and small quantities of fertilizer dust and leaves the column by way of line 11 through which it enters cyclone 12 where it is freed from the dust particles. The dust is returned to the swirling bed 17 by way of conduit 14. The dustless steam-containing air leaves the cyclone through line 13.

EXAMPLE

Air, heated in a steam heater to 120° C., was conducted through a swirling bed column 6. The air stream was distributed in the column by a sieve 5 of 325 mesh stainless steel. The velocity of the stream in the column was 1.0 m./sec. The temperature inside the column was 110–115° C.

An 85 weight percent aqueous urea solution was carried through line 7 into heater 8 and therein heated to 140° C. Thereafter, the solution was sprayed into column 6 by nozzle 9. From the swirling bed 17, formed from dry urea particles, urea granulate continuously was withdrawn through overflow 15 and conducted to a collector through line 16. The free-flowing granulate thus obtained had the following composition:

| | Weight percent |
|---|---|
| Nitrogen | 46.4 |
| Biuret | 0.6 |
| Water | 0.28 |
| Free $NH_3$ | 0.01 |

10 weight percent of the granules obtained had a diameter of more than 4 mm., 85 weight percent of the granules had a diameter of 0.8–4 mm., and 5 weight percent had a diameter of less than 0.8 mm.

Albeit this example relates to urea, it should be understood that other fertilizers, e.g., ammonium nitrate, ammonium sulfate, and others, can be processed in a like manner with comparable results.

We claim as our invention:

1. A device for the continuous granulation of nitrogenous fertilizer which comprises, in combination, a column, a heater for preheating an aqueous fertilizer solution to substantially 120–145° C. connected to said column; a nozzle entering said column for spraying said preheated solution therein in droplets; means for regulating the rate of solution entering into said column; a second heater for preheating air to substantially 60–125° C. connected to the bottom of said column; means for imparting a steady flow of said preheated air through said column; said air, upon contact with said droplets, dehydrating the same and converting them into solid beads which are held in suspension by said air thus forming a swirling bed, said nozzle entering directly into said swirling bed; an outlet in the form of an overflow at the upper level of said bed for continuous withdrawal of part of said beads as finished product; a cyclone connected to the upper part of said column for the removal of entrained fertilizer from said air stream after traversing said bed; and means for the return of said particles into said bed.

2. The device as defined in claim 1, wherein said nozzle is an atomizing jet; and a compressed air inlet in said jet for effecting atomization of said solution.

References Cited

UNITED STATES PATENTS

| 2,635,684 | 4/1953 | Joscelyne | 34—10 |
| 3,130,225 | 4/1964 | Friend | 71—64 |
| 3,212,197 | 10/1965 | Crawford | 34—10 |
| 3,255,036 | 6/1966 | Kramer et al. | |

S. LEON BASHORE, Primary Examiner

R. O. BAJEFSKY, Assistant Examiner

U.S. Cl. X.R.

34—10, 22, 57; 71—28, 58, 64